May 1, 1945.　　　N. T. NARANICK　　　2,374,696
SELF HEATING CONTAINER
Filed May 27, 1943　　　2 Sheets-Sheet 1
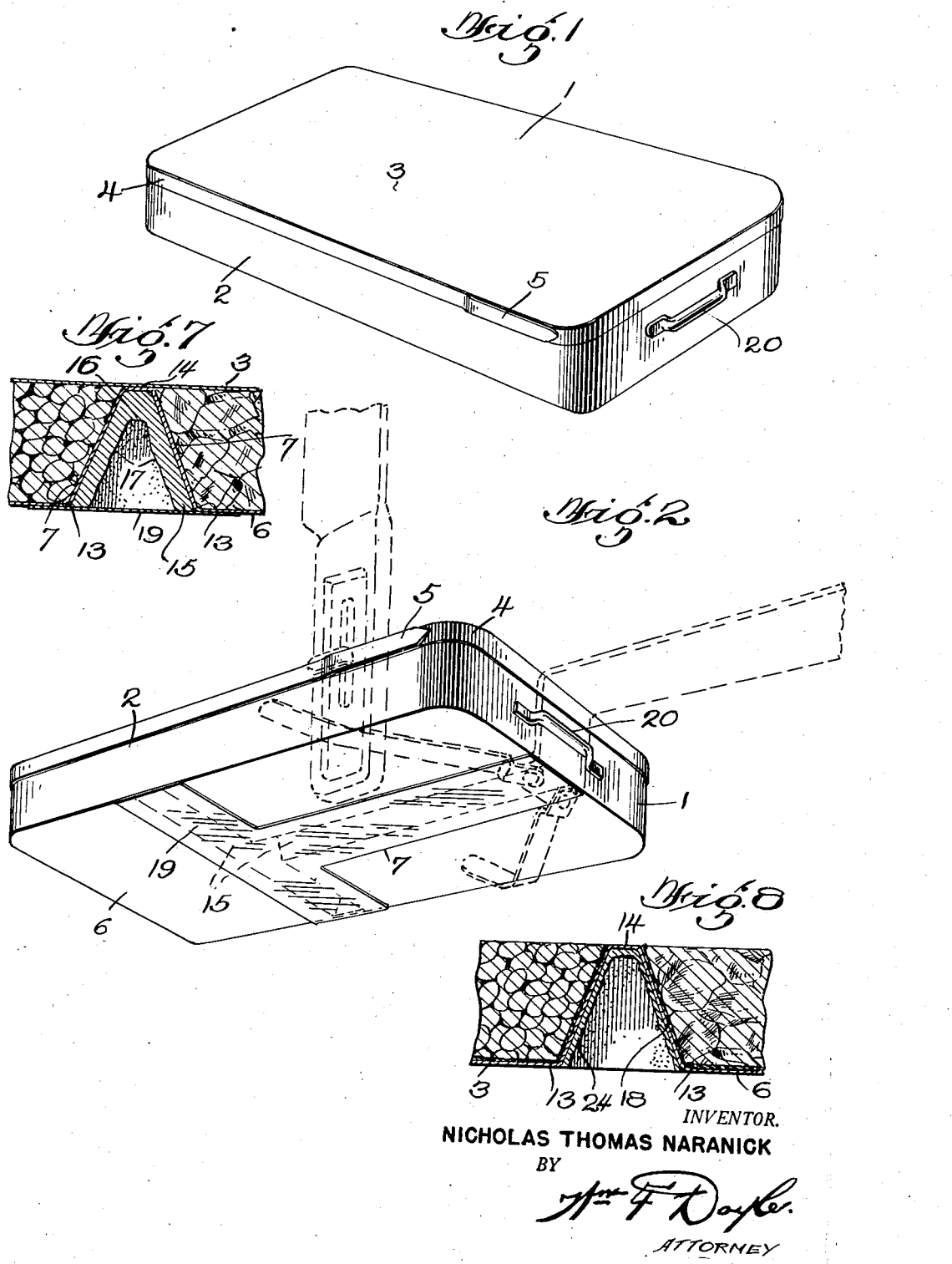
INVENTOR.
NICHOLAS THOMAS NARANICK
BY
Wm F Doyle
ATTORNEY May 1, 1945.　　　　N. T. NARANICK　　　　2,374,696
SELF HEATING CONTAINER
Filed May 27, 1943　　　　2 Sheets-Sheet 2
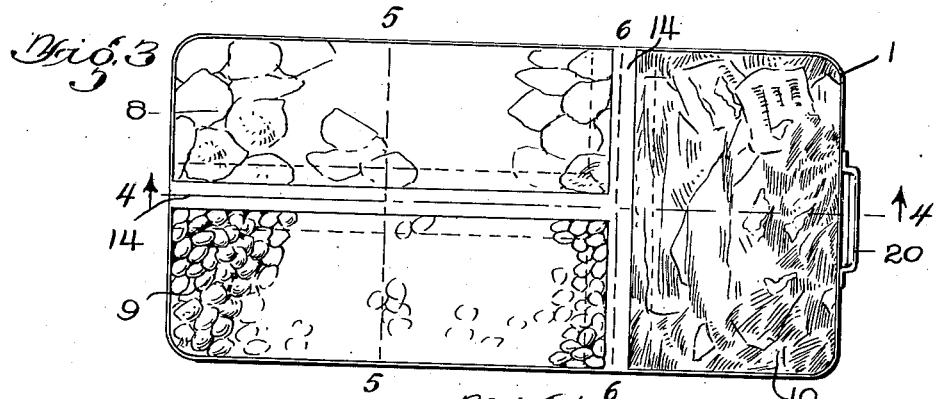
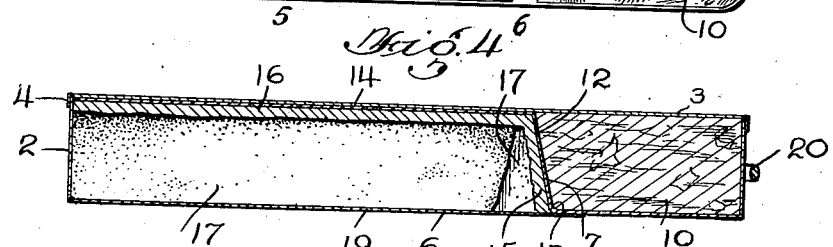
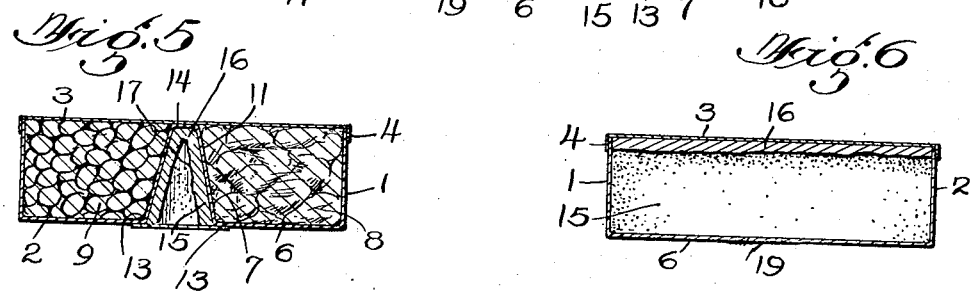
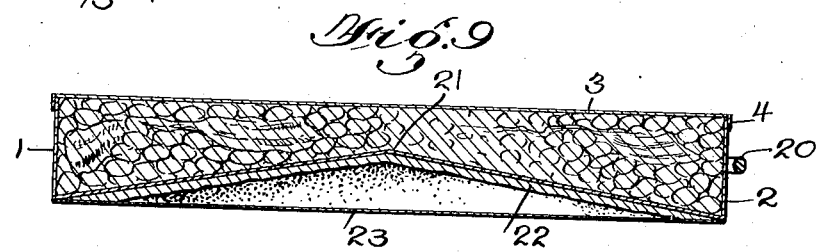
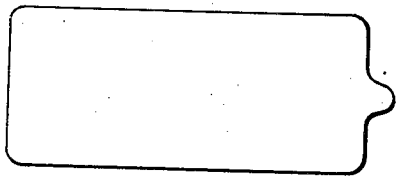
INVENTOR.
NICHOLAS THOMAS NARANICK
Wm F Doyle
ATTORNEY

Patented May 1, 1945

2,374,696

UNITED STATES PATENT OFFICE 2,374,696

SELF-HEATING CONTAINER

Nicholas Thomas Naranick, United States Army, Casper, Wyo.

Application May 27, 1943, Serial No. 488,709

3 Claims. (Cl. 126—262)

(Granted under the act of March 3, 1883, as amended April 30, 1928; 370 O. G. 757)

The invention described herein, if patented, may be manufactured and used by or for the Government for governmental purposes, without the payment to me of any royalty thereon.

This invention relates to ration containers for Army or other use and more specifically to ration containers provided with self-heating means, the combustion of which produces a very subdued light and practically no smoke. Said heating medium is preferably spread in plastic form in troughs or over the under-surfaces of the container which later sets, and is adapted to burn in such a manner as to heat the contents of the container to the desired temperature in approximately 5 minutes and thus provide a soldier in the combat zone with a complete hot meal of a variety of well prepared and seasoned foods under any weather conditions, without disclosing to the enemy his location by either smoke or flame.

An object of this invention is to provide a ration container, wherein a variety of foods may be placed and later cooked or heated in the field to supply a soldier or others with fresh hot meals when remote from any other means, or for various reasons the usual heating and cooking means cannot be used.

Another object is to provide heating means that will operate under any weather conditions.

Another object is to provide a container of such shape as will conveniently pack in the usual army equipment in various positions either stacked or forming a lining about the interior of the haversack, or in a convenient form of separate package.

A further object is to provide a ration container that if necessary the requirements of 7 days' food may be conveniently carried in the usual army haversack.

Another object is to provide a self-heating ration container wherein the heating medium will not produce a flame or smoke which may disclose the position of the consumer to the enemy.

A further object is to provide a construction of ration container that will not permit the burning, scorching or blackening of its contents regardless of how hot a fire is applied to same.

Another object is to provide a heating medium that will not flame or smoke and that will leave a residue attached to the container after burning that will retain the heat within the receptacle and food content therein hot, for a period after the heating medium is entirely consumed.

A further object is to provide a ration container that may be produced, filled and sealed more economically as to time and materials, and occupy less space for shipment, it being possible to pack as many meals in one shipping case, as at present are packed in three, thus saving shipping and packing cost of two cases out of every three and also one that offers greater facilities and conveniences to the user to obtain a hot meal, than has in the past been provided, and with no danger to him.

Another object is to provide a heating medium that cannot be extinguished by wind, rain, snow, sleet or dampness, and a self-heating container having its heating medium covered prior to use to prevent deterioration of its burning qualities during shipment, storage and other delayed use.

The above and other objects and benefits will appear in the specification and be finally pointed out in the appended claims.

Similar numerals indicate corresponding parts in all the figures of the drawings in which:

Fig. 1 is a perspective view showing the upper face of my improved self-heating ration container.

Fig. 2 is an underneath perspective view of the container showing transparent covering over the troughs in which the heating medium is deposited and showing in dotted lines a holder for supporting the container while heating, when the cover is being removed and while the contents of the container are being consumed, and also showing in dotted lines the handle of a table knife in position for removing the strip to release the cover from the body of the container.

Fig. 3 is a plan view of the container and contents with the cover removed.

Fig. 4 is a longitudinal section as indicated by line 4—4 on Fig. 3 with the cover place.

Fig. 5 is a transverse section on line 5—5 of Fig. 3.

Fig. 6 is a transverse section on line 6—6 of Fig. 3.

Fig. 7 is an enlarged sectional view of the preferred form of inverted V-shaped trough with the heating element and protecting oil or wax sheet in place.

Fig. 8 is a view similar to Fig. 7 showing the inner faces of the trough with a thin coating of char, as a heat retainer and on their outer faces a film of grease or juices from the food between the food and said faces after the heating medium has been consumed.

Fig. 9 is a sectional view through a modified form of container showing a different manner of application of the heating element.

Fig. 10 is a reduced plan view of the container showing a modified form of cover removing means.

While the drawings and description in this application cover specific forms of containers, it will be understood that slight changes therein as to the arrangement of the compartments, and minor details of construction may be resorted to, without falling beyond the scope of the claims.

Referring now to the parts by numerals, 1 indicates a container preferably of an elongated, comparatively flat or shallow, rectangular form, consisting of a body portion 2, a cover 3 and a sealing and cover retaining strip 4 having a free extension 5, said strip adapted to hermetically seal the interior of the container, and is adapted when opening the container to be torn from its place in the usual manner by a key, or by any other instrument or tool having a slot therein through which the free end of the strip may be threaded, and torn from the container by winding it around the opener such as the slotted handle of an army table knife, as shown in dots in Fig. 2 of the drawings.

In the form of container shown in Figs. 1 to 8 inclusive, the bottom 6 of the container is provided with inverted V-shaped grooves or troughs 7 pressed therein, open at their lower ends and closed at their tops extending from the bottom of the container up to approximately the top, which may be arranged in various positions adapted to divide the interior of the container into the desired number of compartments of the preferred form and relative capacity.

The container shown is divided into three compartments, two longitudinally arranged as seen at 8 and 9 and one at 10 arranged transversely across one end of the container, separated by longitudinal and transverse troughs 11 and 12 respectively, formed in the bottom of the container.

A specific form of V-shaped trough as shown and described is preferred for the purposes of this invention and is of inverted V-shape, having the lower ends of the sides 13—13 spaced well apart, and having its apex or upper end flattened at 14 which will be explained later.

The heating element, or chemical of about the consistency of putty, which later sets, is applied to the said side faces of the trough as shown at 15, and to the flattened top of the trough as seen at 16. Said heating element is applied as above in such a manner as to form a V-shaped depression 17 in the heating element between the sides to provide for ventilation and thereby assist combustion of the heating medium or element which after starting to burn will not be blown out by wind or extinguished by any other of the elements.

Said specific form of V-shaped grooves or troughs further provides for free circulation of juices flowing from the food within the container as the heat from the heating element passes through the walls of the trough, which prevents burning or searing of the food as indicated at 18.

To prevent deterioration of the heating element by rain, snow, sleet, dampness or other atmospheric condition, during storage or transportation prior to consumption, all heating element areas exposed, are covered with wax or oil paper or the like, as shown at 19.

A type of heating element preferred for use with this self-heating ration container is one that after ignition, will smoulder or simmer without smoke or flame, which would otherwise display the location of, for instance, a soldier or others to an enemy. Another characteristic of the heating element is that, after the element is consumed, a residue consisting of a thin layer of char 24, is left clinging to the surfaces previously covered by the heating element, which remains in a glow and is an insulation, that will prevent the radiation of heat from the container and maintain the food therein in a palatable condition over a short period, such as the time required for the consumption of the food, regardless of the condition of the weather.

A loop 20 is mounted at the end of the container for the reception of a holder shown in dots in Fig. 2 whereby the container may be held while heating, while the cover is being removed and while the contents of the container are being consumed.

Roughly, the full size ration container measures approximately 8 inches long, 4 inches in width and 1 inch deep. The inverted V-shaped troughs are about 1 inch deep, ½ inch across their open bases and about ⅛ inch across their flattened tops.

The container may be pressed into its desired form by power press. The food contents of the container are placed therein, and then heated to the proper heat required to vacuum seal, and the lid is then applied and sealed. The heating material is then applied to the troughs or channels or other surfaces in the bottom of the container and pressed firmly in place, and then all exposed areas to which the heating element is applied are covered with oil or wax paper.

In use, the container is placed in the holder, the corner of oil or wax paper is removed, the heating element is ignited with a match, flint, cigarette or any other flame or incandescent means. When the heating element is exhausted and container and contents are heated, the cover is removed and the meal will be ready to be eaten, it having been properly heated in each of the compartments, thus providing the soldier or others, the benefits of a hot meal while being away from any other opportunity of obtaining same.

If the contents of the container require a greater amount of heat than will be provided by the heating medium in the depressions or V-shaped troughs in the bottom of the container, the entire bottom of the container may be formed to provide a depressed space throughout to which surface may be applied the heating medium as shown in Fig. 9, wherein the bottom of the container is depressed from its lower outer edges toward its center at 21 and the heating medium at 22 will cover the entire bottom of the container, or if the foods are separated into different compartments, and the contents of one of the compartments require more heat than others, the bottom of that particular compartment may be provided with a coating of the heating medium, and the heating of other compartments will depend on the heating medium deposited in the V-troughs between the other compartments for their required heat. In the above instances, the oil or wax paper 23 will cover the heating element wherever it is applied.

Fig. 10 shows a modified form of container wherein the cover is secured to the container in any preferred manner and is provided with an extending tongue with which a slotted tool may be engaged and the entire cover may be rolled back and torn from the top of the body of the container to expose its contents.

What I claim and desire to secure by Letters Patent is:

1. An article of manufacture comprising a container having imperforate inverted V-shaped troughs, open at their lower ends, formed in its bottom, said troughs dividing the interior of the container into different chambers for the reception of the same or different foods to be heated, a combustible heating composition in the troughs, which when ignited, will burn in a smouldering manner, and heat the contents of the container, and a protective waterproof covering arranged over the heating composition.

2. An article of manufacture comprising a container having imperforate inverted V-shaped troughs, open at their lower ends, formed in its bottom, said troughs dividing the interior of the container into different chambers for the reception of the same or different foods to be heated, a combustible heating composition in the troughs, which when ignited, will burn in a smouldering manner and leave a char adapted to retain the heat of the contents of the container, and a protective waterproof covering arranged over the heating composition.

3. An article of manufacture comprising a container of rectangular outline, the bottom of said container having a larger area than the top of the same, portions of the area of said bottom constituting food-contacting, heat-absorbing surfaces, said portions being formed by inverted V-shaped channels in said bottom whose depth is substantially the depth of said container, a combustible heating composition in said channels adapted, when ignited, to heat said heat absorbing surfaces, and a covering of flexible waterproof material applied over said channels to protect said heating composition.

NICHOLAS THOMAS NARANICK.